United States Patent [19]
Kojima

[11] Patent Number: 5,329,530
[45] Date of Patent: Jul. 12, 1994

[54] RADIO CONNECTION SYSTEM
[75] Inventor: Susumu Kojima, Tokyo, Japan
[73] Assignee: NEC Corporation, Japan
[21] Appl. No.: 966,866
[22] Filed: Oct. 26, 1992
[30] Foreign Application Priority Data
Oct. 25, 1991 [JP] Japan .................................. 3-307035
[51] Int. Cl.⁵ ............................................ H04B 7/212
[52] U.S. Cl. .................. 370/85.7; 370/95.3; 455/34.2; 455/56.1
[58] Field of Search .................. 370/39, 30, 85.7, 95.1, 370/95.3; 455/34.1, 34.2, 54.2, 56.1; 379/63
[56] References Cited
U.S. PATENT DOCUMENTS
4,982,441 1/1991 Hashimoto et al. ............... 455/54.2
5,003,534 3/1991 Gerhardt et al. .................. 370/95.3
5,134,615 7/1992 Freeburg et al. .................. 370/95.3
5,193,209 3/1993 Maeda et al. ...................... 455/34.2

Primary Examiner—Benedict V. Safourek
Attorney, Agent, or Firm—Ostrolenk, Faber, Gerb & Soffen

[57] ABSTRACT

A radio connection system capable of improving the number of successfully completed connections between base stations and mobile stations, without resorting to complicated control systems and, therefore, desirably obtaining dynamic channel assignment. A base station transmits a proposed available radio frequency to a mobile unit which has issued a connection request and then waits to receive an answer from the mobile unit in any slot timing at the proposed radio frequency. The mobile unit detects a time slot which it can use and returns an answer to the base station in that time slot.

4 Claims, 10 Drawing Sheets

BASE STATION A: | SLOT 1 | SLOT 2 | SLOT 3 | SLOT 4 | SLOT 1 |

Fig. 5B

BASE STATION B: | SLOT 4 | SLOT 1 | SLOT 2 | SLOT 3 | SLOT 4 | SLOT 1 |

BASE STATION A | TX 1 | TX 2 | TX 3 | TX 4 | RX 1 | RX 2 | RX 3 | RX 4 | TX 1 | TX 2 |

*Fig. 6A*

BASE STATION B | RX 1 | TX 1 | TX 2 | TX 3 | TX 4 | RX 1 | RX 2 | RX 3 | RX 4 | TX 1 |

RADIO CONNECTION SYSTEM

BACKGROUND OF THE INVENTION

The present invention relates to a radio connection system for connecting a base station and a mobile unit included in a digital mobile communication system using TDMA (Time Division Multiple Access) communication channels and, more particularly, to a radio connection system feasible for dynamic channel assignment.

A digital mobile communication system using TDMA communication channels, e.g., a radio telephone system has a plurality of base stations and a plurality of mobile units connectable to the base stations over radio channels. In each radio zone, the TDMA channels may be implemented as two TDMA channels each having a particular frequency, i.e., an upgoing channel and a down-going channel. Alternatively, a single TDMA channel may have the frame thereof divided into an up-going channel and a down-going channel each having a plurality of time slots. This kind of channel configuration is generally referred to as a Ping-Pong type configuration. Further, to enhance the efficient use of frequencies in such two conventional implementations, nearby radio zones may share a single radio frequency while using particular time slots each.

It has been customary with a mobile communication system to connect a base station and a mobile unit by the following procedure. On receiving a connection request from a mobile unit, a base station informs the mobile unit of, among time slots which it does not use, a time slot determined to be unoccupied by carrier sensing and a radio frequency assigned thereto. Then, the base station awaits an answer from the mobile unit in the unoccupied time slot. The mobile unit determines whether or not the reported time slot is unoccupied by carrier sensing and, if it is unoccupied returns an answer to the base station in that time slot. The reason that the mobile unit also executes such a decision is that an interference wave or a jamming wave is likely to affect the mobile unit although it may be negligible at the location of the base station. When the mobile unit determines that the reported time slot is occupied, the base station does not receive an answer before a predetermined period of time elapses. To increase the connection ratio, it is a common practice for the base station to report to the mobile unit a plurality of usable candidate time slots beforehand or to select another usable time slot on the expiration of the predetermined period of time and reports it to the mobile unit.

However, the problem with the conventional approaches for a higher connection ratio is that complicated sequence control with strict timings is needed. Therefore, both the base unit and the mobile unit have complicated control in units or software control.

Assume a system wherein nearby radio zones share the same radio frequency and use respective time slots in order to enhance efficient use of frequencies. Then, the probability increases that the time slot determined to be unoccupied by the base unit will be determined to be occupied by the mobile unit when it is occupied by the adjoining radio zone. This rather lowers the connection ratio while simply increasing the frequency of the above-stated complicated sequence.

The Ping-Pong type system using the same frequency band for transmission and reception has the following drawback. Assume that mobile units communicating with respective base stations at adjoining radio frequencies approach each other. Then, if the base stations are not synchronous in frame to each other, a leakage of the electric wave being sent from one mobile unit interferes with the communication of the other mobile unit. At this instant, the level of the leakage is extremely low. Hence, when a time slot is to be reported from some base station to one mobile unit, the leakage is not received by the base station despite the existence of another mobile unit communicating with an adjoining base station near the above-mentioned unit, again lowering the connection ratio.

The channels to be used by base stations have customarily been fixedly assigned. Nowadays, a dynamic channel assignment system is under study which changes the frequency every time a connection is set up, as needed. The prerequisite with such dynamic channel assignment is that the control over radio connection be simple.

SUMMARY OF THE INVENTION

It is therefore an object of the present invention to provide a radio connection system which enhances the connection ratio without resorting to complicated control and is, therefore, desirably applicable to dynamic channel assignment.

In accordance with the present invention, in a radio connection system for a mobile communication system comprising a plurality of base stations and a plurality of mobile units connectable to the base stations over TDMA communication channels, the radio base stations each reports only a radio frequency to one of the mobile units which has sent a connection request to the base station, awaits an answer from the mobile unit at the radio frequency, and assigns a time slot occurring when the answer is received as a communication channel. The mobile unit receives a radio frequency wave over at least one TDMA frame to find unoccupied time slots and sends the answer to the base station in one of the unoccupied time slots.

Also, in accordance with the present invention, in a radio connection system for a mobile communication system comprising a plurality of base stations and a plurality of mobile units connectable to the base stations over TDMA communication paths, the radio base stations each reports a radio frequency and an unoccupied time slot at that radio frequency to one of the mobile units which has sent a connection request to the base station, awaits an answer from the mobile unit at the radio frequency, and assigns a time slot occurring when the answer is received as a communication channel. The mobile station determines, on receiving a radio frequency wave, whether or not the time slot reported is unoccupied, sends, if the time slot reported is unoccupied, the answer to the base station in the time slot reported or, if the time slot reported is occupied, receives the radio frequency wave over at least one TDMA frame to find unoccupied time slots and sends the answer to the base station in one of the unoccupied time slots.

Further, in accordance with the present invention, in a radio connection system for a mobile communication system comprising a plurality of base stations and a plurality of mobile units connectable to the base stations over TDMA communication channels, the TDMA communication channels each being assigned to respective one of the base stations is divided into an up-going and a down-going channel each having a plurality of time slots. The base stations each reports only a radio frequency to one of the mobile units sent a connection request to the base station, awaits an answer from the mobile unit at that radio frequency, and assigns a time slot occurring when the answer is received as a communication channel. The mobile unit detects, when detecting unoccupied time slots after reception of an electric radio frequency wave, time slots without a signal on both of the up-going and down-going channels, and transmits the answer to the base station in the time slots.

Moreover, in accordance with the present invention, in a radio connection system for a mobile communication system comprising a plurality of base stations and a plurality of mobile units connectable to the base stations over TDMA communication channels, the TDMA communication channels each being assigned to respective one of the base stations is divided into an up-going and a down-going channel each having a plurality of time slots. The base stations each reports a radio frequency and an unoccupied time slot at the radio frequency to one of the mobile units sent a connection request to the base station, awaits an answer from the mobile unit at the radio frequency, and assigns a time slot occurring when the answer is received as a communication channel. The mobile unit detects, when detecting unoccupied time slots after reception of an electric wave of the radio frequency, time slots without a signal on both of the up-going and down-going channels, and transmits the answer to the base station in the time slots.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
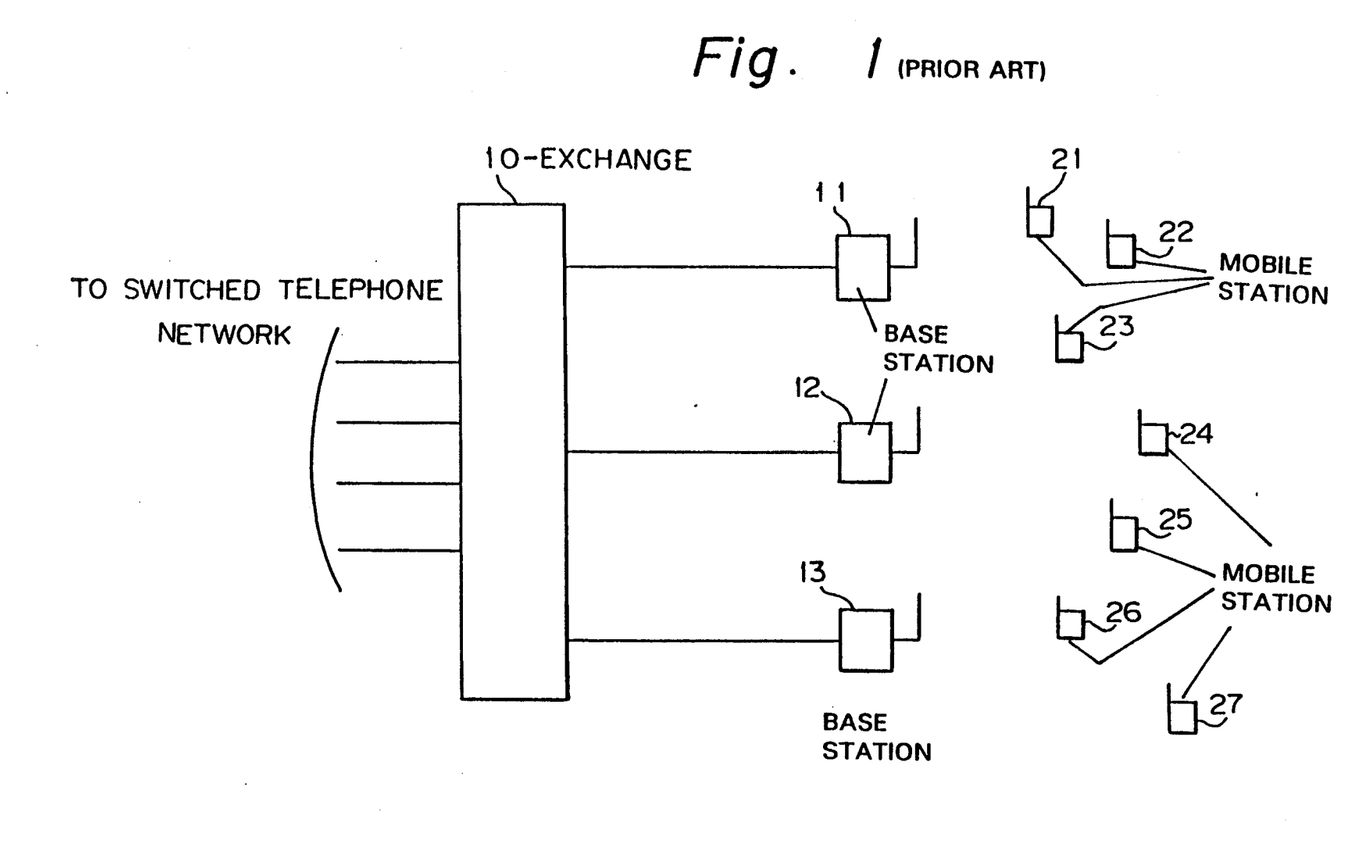
FIG. 1 is a block diagram schematically showing a radio telephone system which is a specific form of a mobile communication system and to which the present invention is applicable.

Referring to FIG. 1 of the drawings, a radio telephone system belonging to a family of mobile communication systems to which the present invention is practically applicable is shown. As shown, the system includes an exchange 10 connected to a switched telephone network by wired telephone lines. A plurality of base stations 11, 12 and 13 are each connected to the exchange 10 by respective lines. A plurality of mobile units, or telephone terminals, 21-27 are connectable to the base stations 11-13 over a plurality of TDMA channels. Specifically, a particular radio frequency is assigned to each of the base stations 11-13.

Figure 2A:
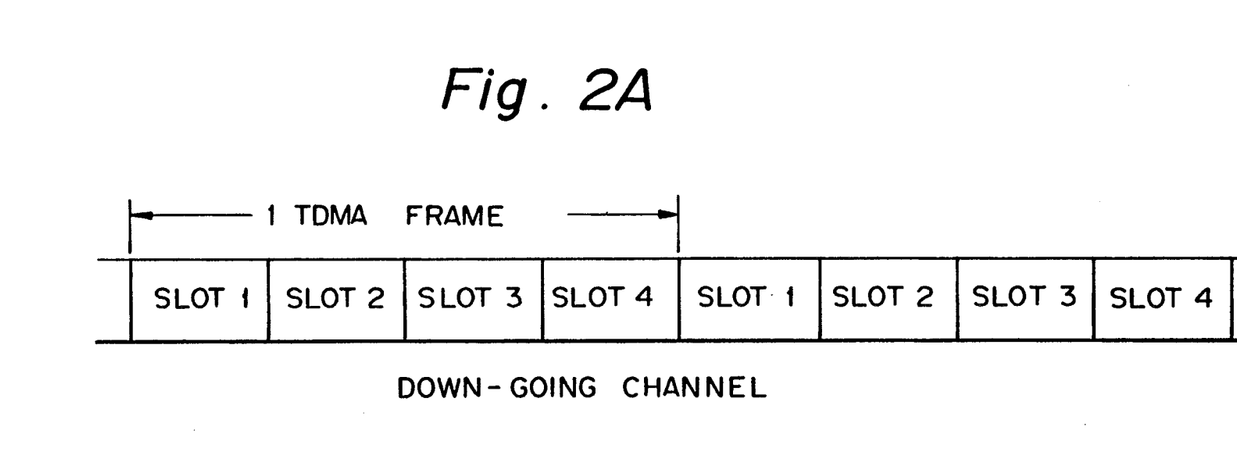
FIGS. 2A and 2B show a specific format of a TDMA frame particular to a two channel system for effecting transmission and reception at different frequencies.
Figure 2B:
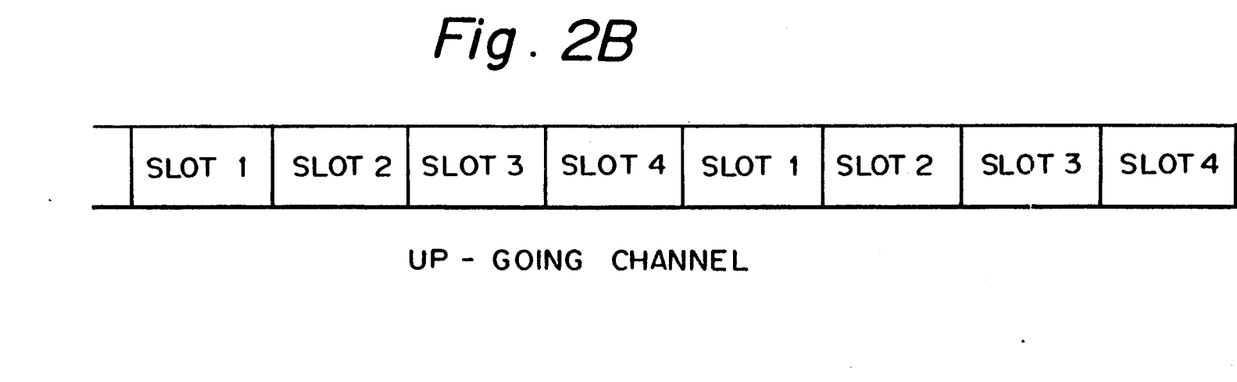

A specific TDMA channel configuration is shown in FIGS. 2A and 2B. This specific configuration uses two channels each having a particular frequency, i.e., a down-going channel (FIG. 2A) and an up-going channel (FIG. 2B). In the up-going and down-going channels, each frame has four consecutive time slots 1-4. One mobile unit communicates with one base station by using, among the time slots 1-4 of the up-going and down-going channels, the time slots of the same number. Therefore, four mobile units are connectable to one base station by use of the two radio frequencies, one for transmission and the other for reception.

Figure 3:
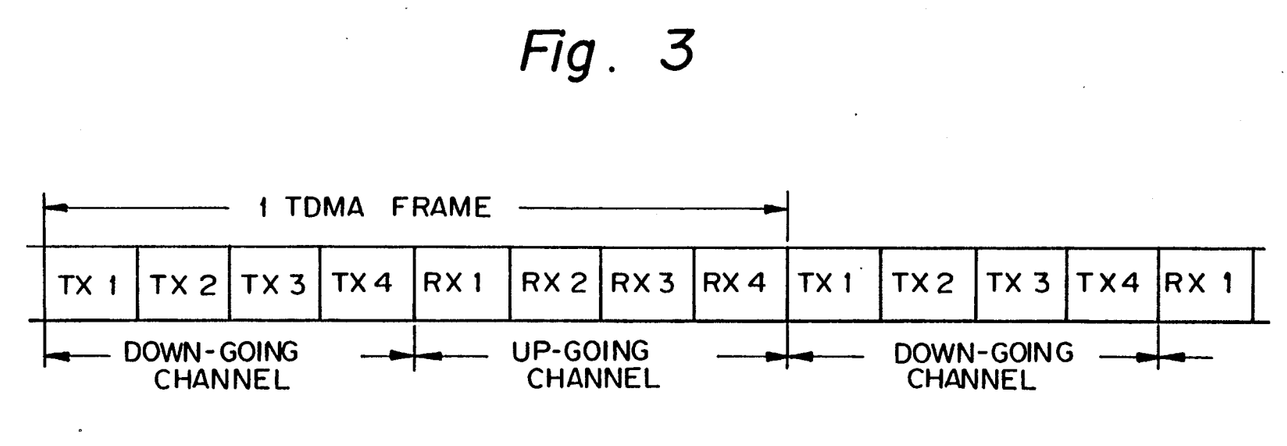
FIG. 3 shows another specific format of a TDMA frame available with a Ping-Pong system.

Another specific TDMA channel configuration is shown in FIG. 3. As shown, one frame is constituted by an up-going and a down-going channel each having a plurality of time slots. This kind of channel configuration is the previously stated Ping-Pong type an causes transmission and reception to occur at the same frequency. The up-going and down-going channels have respectively time slots RX1-RX4 and time slots TX1-TX4, as in the configuration of FIGS. 2A and 2B. Base stations send data by using the time slots TX1-TX4 while mobile units send data by using the time slots RX1-RX4. The time slots TX1-TX4 correspond to the time slots RX1-RX4, respectively. Since each mobile unit uses, among the time slots X1-TX4 and RX1-RX4, those designated by the same number, four mobile units are connectable to one base station by using a single radio frequency.

Reference will now be made to FIGS. 4, 5A, 5B, 6A and 6B for describing a radio connection system embodying the present invention.

Figure 4:
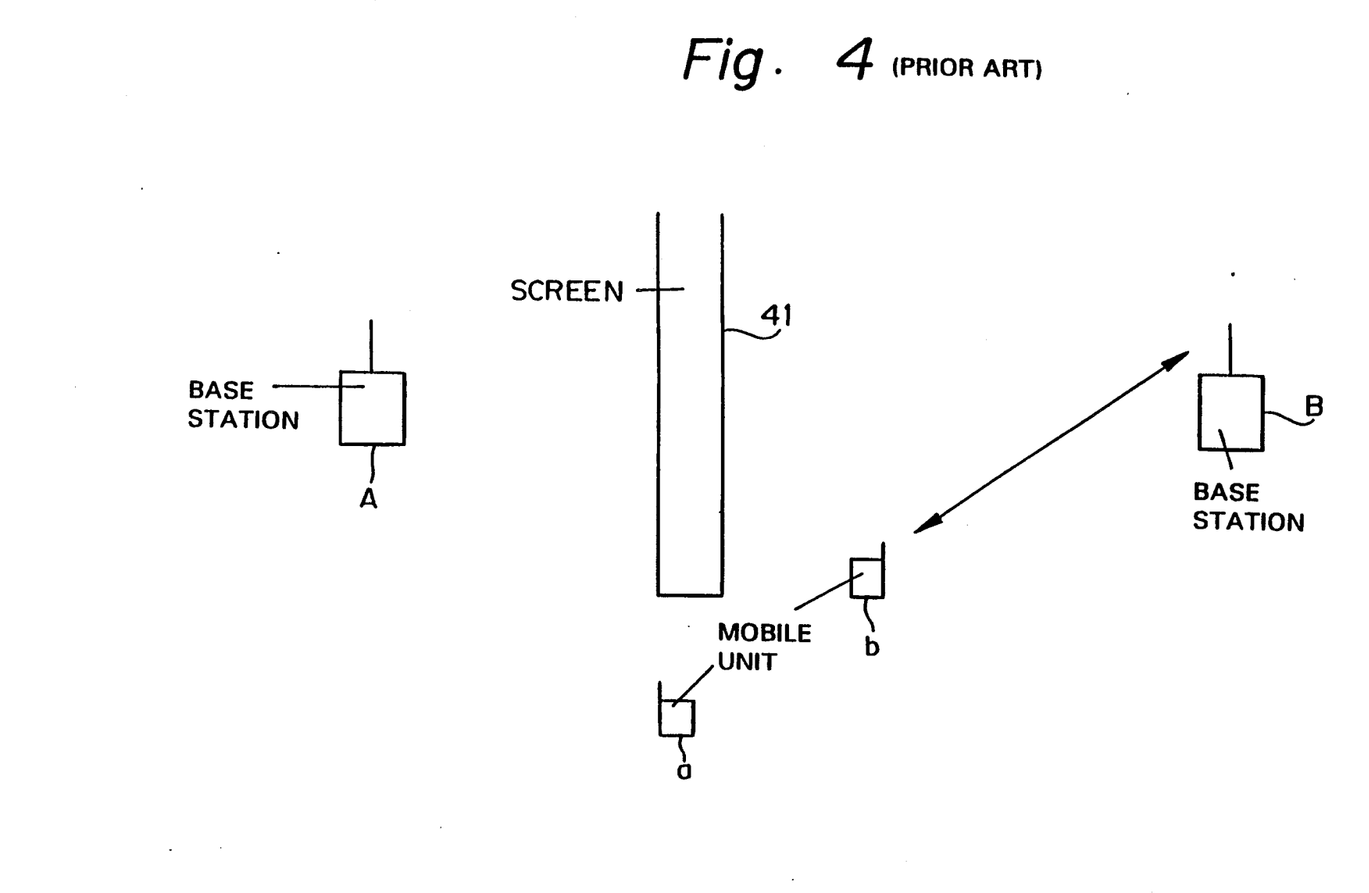
FIG. 4 shows a specific positional relation of base stations and mobile stations located in two radio zones which are separated by a screen.

As shown in FIG. 4, assume that base stations A and B are located on opposite sides of a screen 41 and have channels of the same radio frequency (frame configuration shown in FIGS. 2A and 2B or FIG. 3). Further, assume that the base stations A and B and mobile units a and b are held in the following specific situation. The base station B and mobile unit b are connected and communicating with each other while the base station A and mobile unit a are in a standby state. Due to the screen 41, the base station A can barely receive electric waves from the base station B and mobile unit b at a level that is sufficient to enable it to determine that a slot is unoccupied by carrier sensing. On the other hand, despite the mobile unit a being located in the connection area with the base station A, it can sufficiently receive electric waves from the base station B and mobile unit b at such a level that it determines that a slot is occupied by carrier sensing. Control over radio connection will be described with reference to FIG. 4 hereinafter.

Figure 5A:
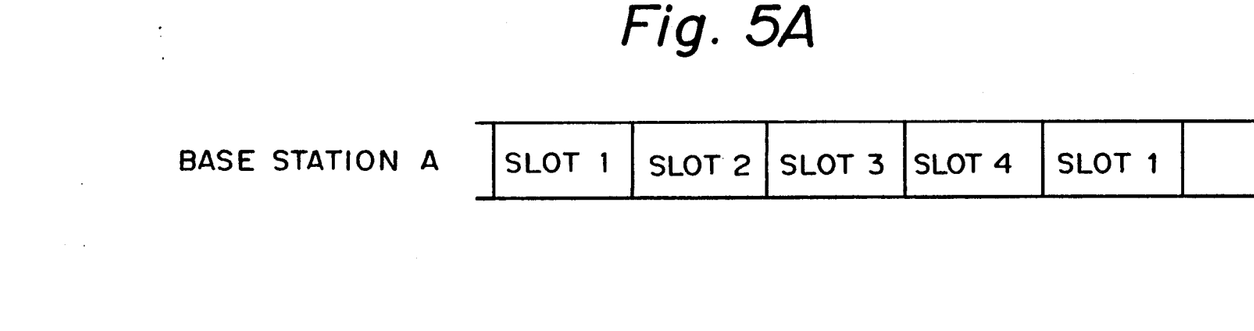
FIGS. 5A and 5B show slot timings of the base stations assuming the two channel system and the two radio zones of FIG. 4.
Figure 5B:
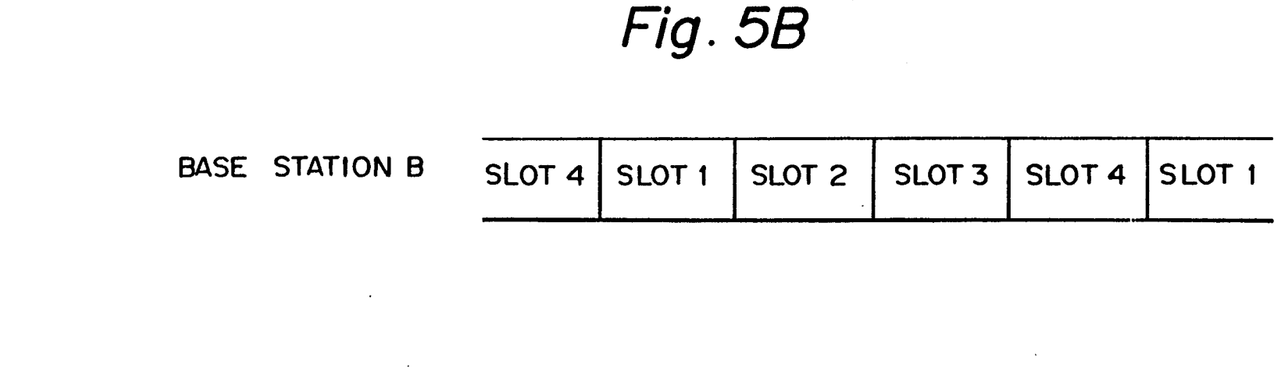

To begin with, assume that the radio telephone system is implemented with the two channel configuration shown in FIGS. 2A and 2B. FIGS. 5A and 5B each shows one of the two channels. As shown, the base stations A and B are not synchronized framewise, i.e., their slot timings are offset from each other. Let the base station B and mobile unit b be connected at the time slot 2 shown in FIG. 5B. On receiving a connection request from the mobile unit a, the base station A controls the connection with either of the following procedures (1) and (2).

(1) The base station A informs the mobile unit a of only the radio frequency and then awaits an answer from the mobile unit a. The mobile unit a receives an electric wave of the informed frequency while determining whether or not a signal is present over, for example, one frame at each slot timing. The mobile unit a can sufficiently receive electric waves from the base station B and mobile unit b, as describe with reference to FIG. 4. Hence, the mobile unit a determines that the slots 2 and 3 shown in FIG. 5A are occupied as a result of carrier sensing, sending an answer to the base station A in the slot 1 or 4. On receiving the answer, the base station A sets the slot 1 or 4 as a communication channel.

(2) The base station A informs the mobile station a not only of the radio frequency but also of a time slot which it determined to be unoccupied, and then awaits an answer from the mobile unit a. At this instant, the base station A cannot receive electric waves from the base station and mobile unit b at a sufficiently high level and, therefore, cannot perform carrier sensing, as also described earlier. Hence, it may occur that the base station A determines that the slot 2 or 3 is unoccupied and reports it to the mobile unit a. On receiving the radio frequency, the mobile unit a performs carrier sensing at the reported slot timing in one frame to see if the slot of interest is unoccupied. If the reported slot is the slot 1 or 4, the mobile unit a determines that it is unoccupied since it does not sense a carrier at such a slot timing. As a result, the mobile unit a returns an answer to the base station A in the unoccupied slot. On the other hand, assuming that the reported slot is the slot 2 or 3, the mobile unit a cannot see if it is unoccupied for the above-stated reason and, therefore, checks each slot of one frame by carrier sensing to find the unoccupied slot 1 or 4. Then, the mobile unit a returns an answer in the slot 1 or 4, as in the previous procedure (1). Since the base station A is ready to receive an answer in any one of the time slots, it receives the answer from the mobile unit a and sets the slot 1 or 4 as a communication channel.

Figure 6A:
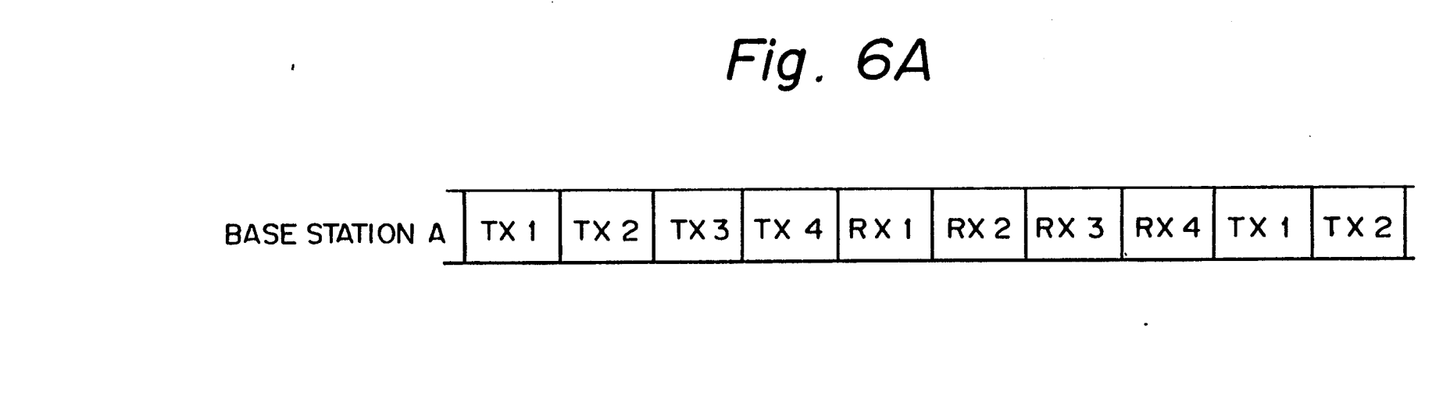
FIGS. 6A and 6B show slot timings of the base stations assuming the Ping-Pong type system and the two radio zones of FIG. 4.
Figure 6B:
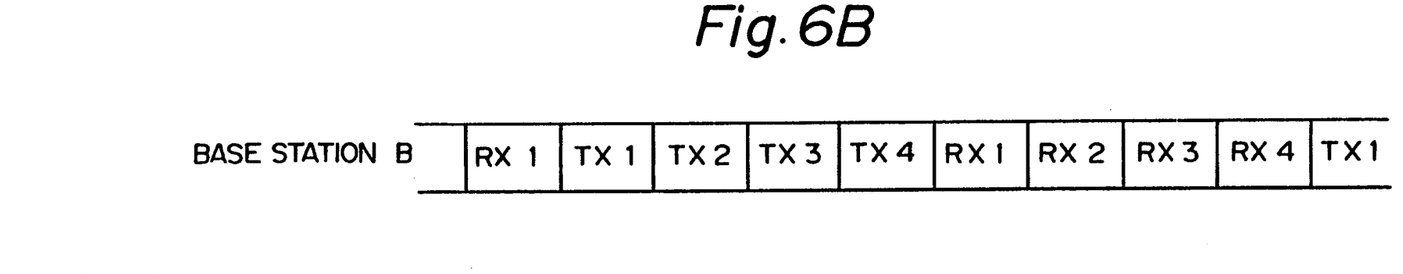
Figure 7:
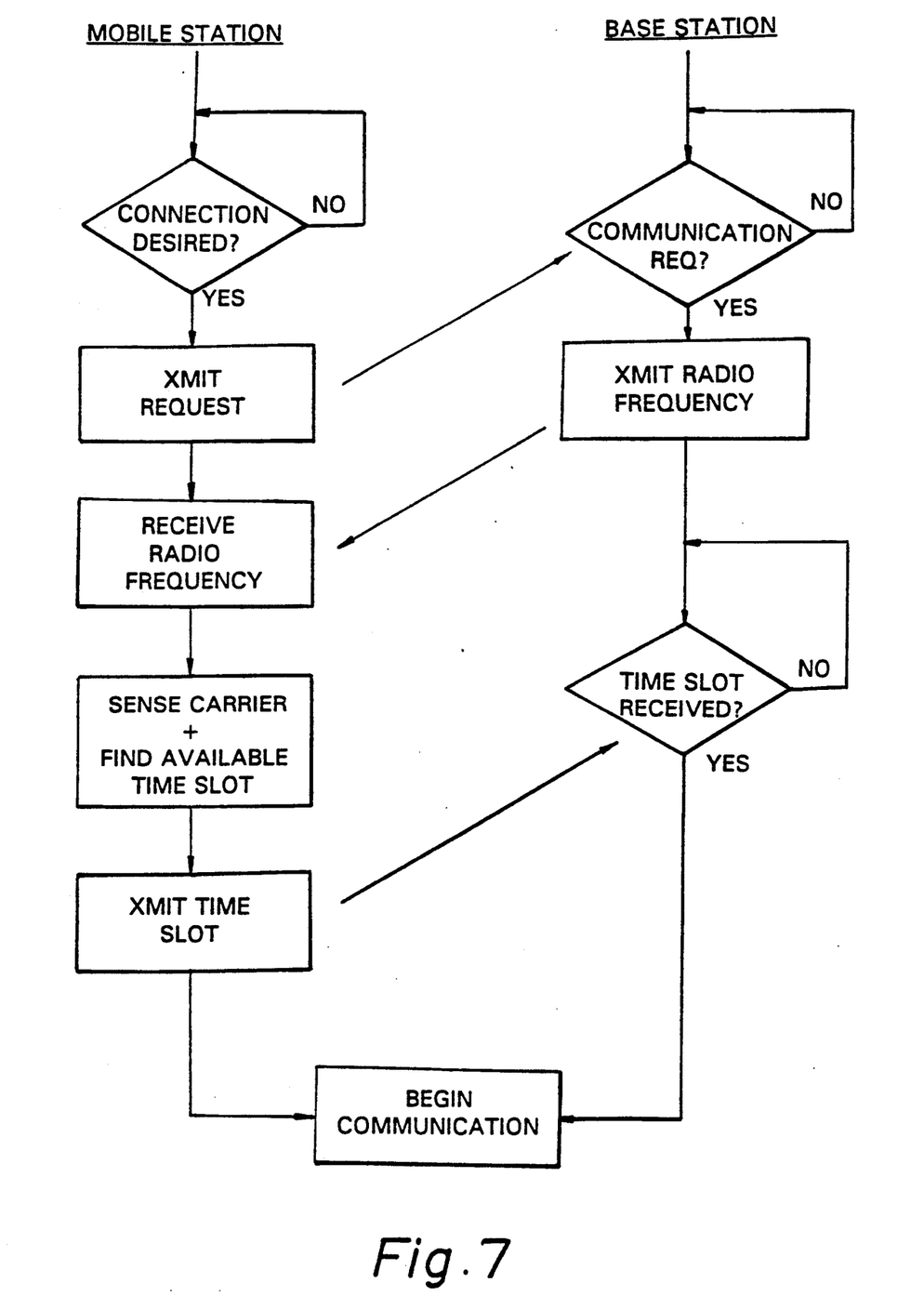
FIGS. 7-10 are flow charts of various embodiments of the invention.
Figure 8:
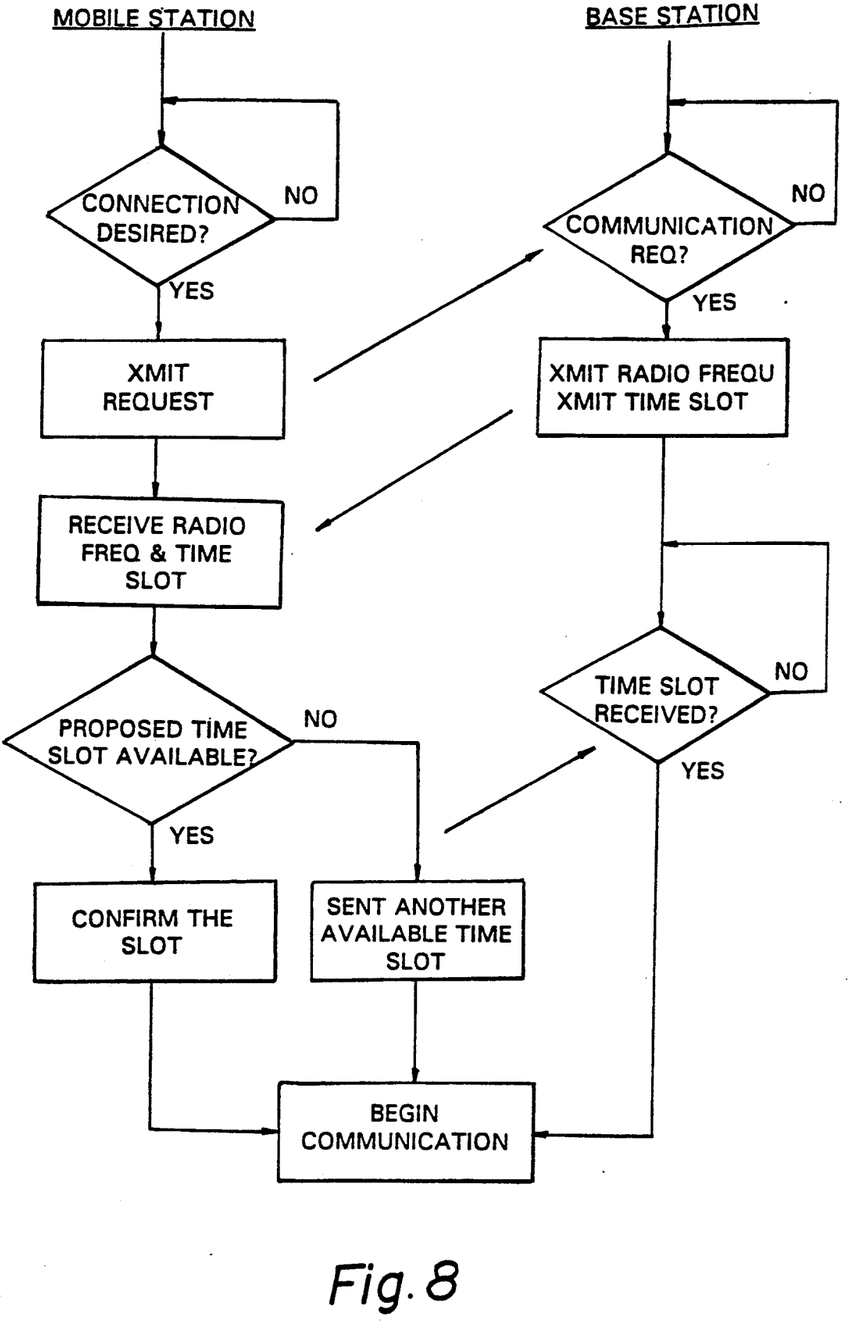
Figure 9:
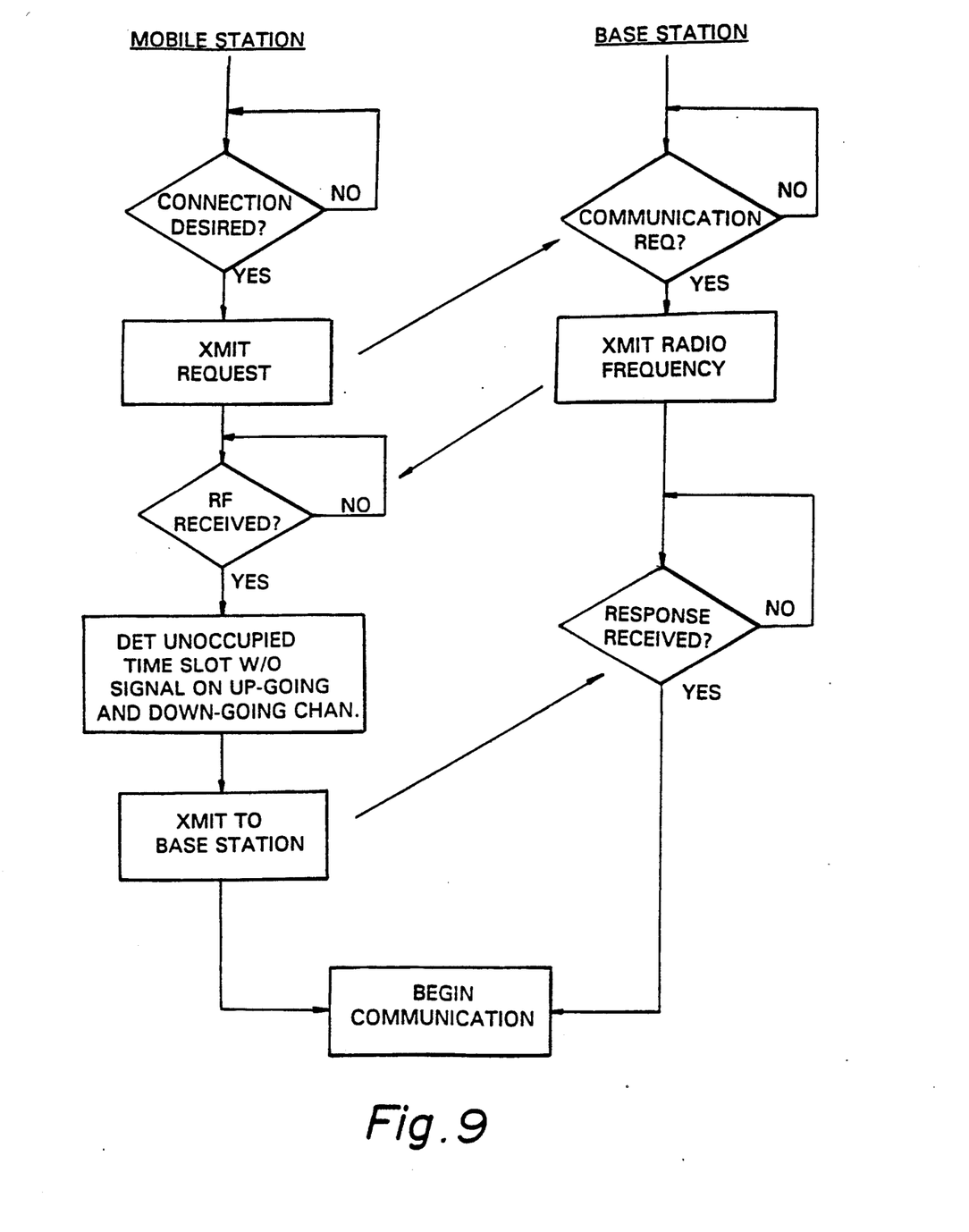
Figure 10:
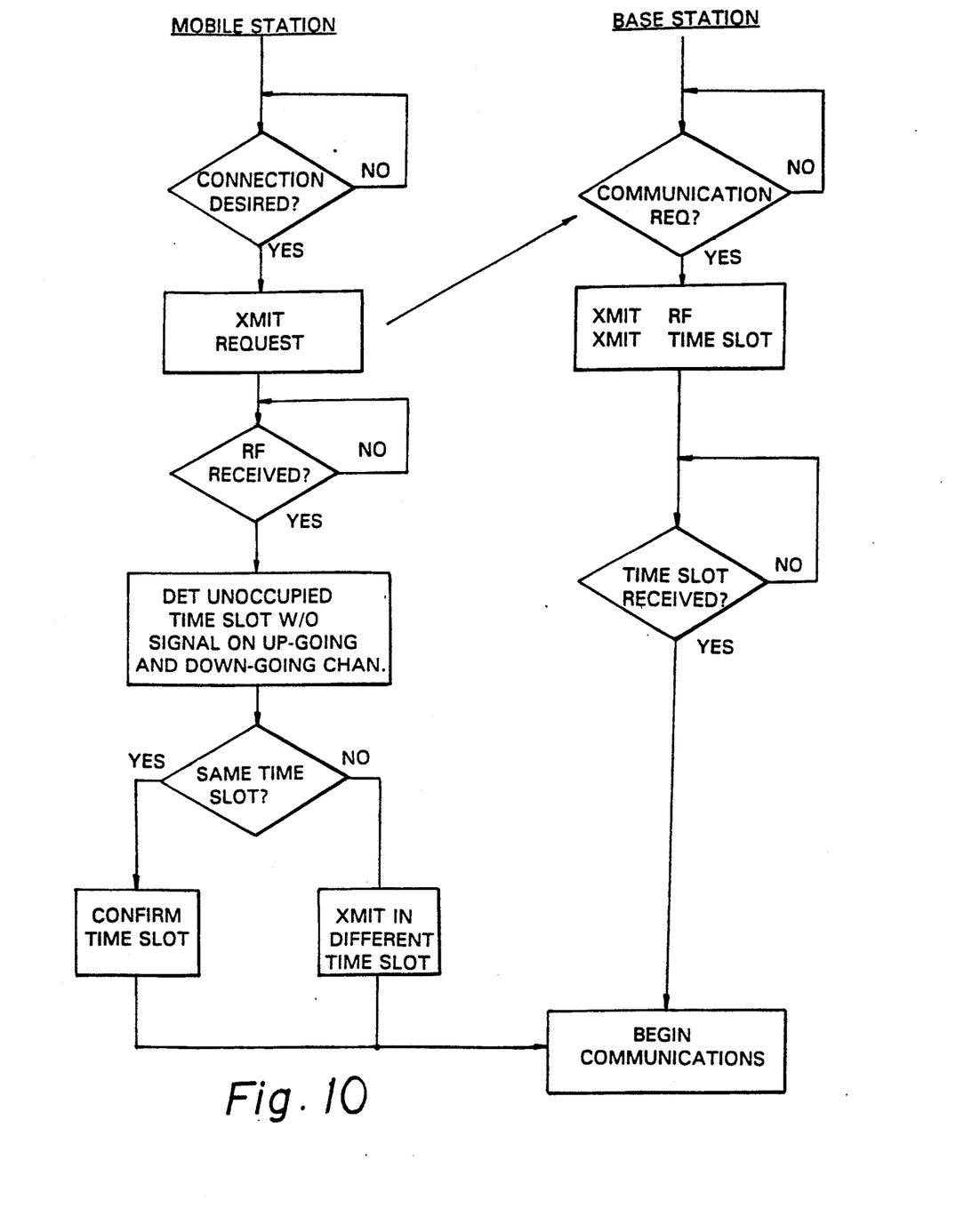

Hereinafter will be described a connection control procedure implemented with the Ping-Pong system shown in FIG. 3. FIGS. 6A and 6B show the slot timings of the base stations A and B, respectively. Again, the base stations A and B are not synchronous in frame, i.e., their slot timings are offset from each other. Assume that the base station B and mobile unit b are connected by the up-going slot RX2 and down-going slot TX2 shown in FIG. 6B. On receiving a connection request from the mobile unit a, the base unit A controls the connection by reporting only the radio frequency or reporting both the radio frequency and the time slot to the mobile unit a. Since the previously described procedure (2) also applies to the control wherein both the radio frequency and the time slot are reported, the following description will concentrate on the control wherein only the radio frequency is reported.

Specifically, the base station A reports only the radio frequency to the mobile unit a and awaits an answer from the mobile unit a at such a frequency. The mobile unit a receives an electric wave of the reported radio frequency while determining whether or not a signal is present over, for example, one frame at each slot timing. The mobile unit a can sufficiently receive electric waves from the base station B and mobile unit b, as describe with reference to FIG. 4. Therefore, the mobile unit a determines that the down-going slots TX3 and 4 of FIG. 6A are occupied on the basis of the electric wave from the base station B, and that the up-going slots RX3 and RX4 are occupied on the basis of the electric wave from the mobile unit b. As a result, the mobile unit a sends an answer to the base station A in the up-going slot RX1 or RX2 of FIG. 6A. The base station A is ready to receive an answer in any one of the time slots and, therefore, receives the answer from the mobile unit a and sets the slots RX1 and TX1 or RX2 and TX2 associated with the answer as a communication path. Assume that the mobile unit a cannot receive an electric wave from the base station B, but it can receive an electric wave from the mobile unit b. Then, the mobile unit a determines that the down-going slots TX3 and TX4 of FIG. 6A are unoccupied and that the up-going slots RX3 and RX4 are occupied. As a result, the mobile unit a returns an answer to the base station A in the slot RX1 or RX2, as in the above-stated condition.

In summary, in accordance with the present invention, a base station is ready to receive an answer from a mobile unit in any time slot at a radio frequency which the former reported to the latter. The mobile unit receives an electric wave of the reported radio frequency over at least one TDMA frame to find unoccupied time slots, and then returns an answer to the base station in one of the unoccupied time slots. On the other hand, when the base station reports a time slot in addition to the radio frequency, the mobile unit determines whether or not the reported time slot is unoccupied beforehand and returns an answer in the reported time slot if it is unoccupied or in any one of the above-mentioned unoccupied time slots if otherwise. On receiving the answer, the base station sets the unoccupied time slot as a communication channel for communicating with the mobile unit.

When use is made of the Ping-Pong type TDMA communication channel configuration, the mobile unit detects, on receiving an electric wave of the reported radio frequency, an unoccupied time slot in both of up-going and down-going channels and returns an answer to the base station in the unoccupied time slots.

With the above system configuration, the present invention enhances the connection ratio since it does not need a complicated sequence control particular to a conventional system which sets up connection in a time slot determined to be unoccupied by a base station. Moreover, even when the base station is not synchronized in frame with other bases stations, the mobile unit selects a time slot other than those occupied by other base stations. This is successful in reducing the probability of interference, especially in the Ping-Pong type system.

Various modifications will become possible for those skilled in the art after receiving the teachings of the present disclosure without departing from the scope thereof.

What is claimed is:

1. An interconnection method for use with a radio connection system for a mobile communication system comprising a plurality of base stations and a plurality of mobile units connectable to said base stations over TDMA (Time Division Multiple Access) communication channels, said method comprising:

said radio base stations each assigning only a radio communication channel frequency and not assigning time slot information to one of said mobile units which has sent a connection request to the base station, said each base station awaiting a response from the mobile unit at any time slot on said radio frequency, and assigning a time slot as a communication channel when said response is received, and said mobile unit sensing a carrier on said radio frequency over at least one TDMA frame to find unoccupied time slots and sending said response to said base station in one of said unoccupied time slots.

2. An interconnection method for use with a radio connection system for a mobile communication system comprising a plurality of base stations and a plurality of mobile units connectable to said base stations over TDMA communication channels, said method comprising:

said radio base stations each assigning a radio communication channel frequency and an unoccupied time slot at said radio frequency to one of said mobile units which has sent a connection request to the base station, said each base station awaiting a response from the mobile unit at any time slot on said radio frequency, and assigning a time slot as a communication channel when said response is received, and said mobile station performing carrier-sensing on said radio frequency over at least one TDMA frame to find unoccupied time slots whether or not said time slot is unoccupied, and sending, if said time slot is unoccupied, said response to said base station in said time slot or, if said time slot is occupied, sending said response to said base station in one of said unoccupied time slots.

3. A connection method for use with a radio connection system for a mobile communication system comprising a plurality of base stations and a plurality of mobile units connectable to said base stations over TDMA communication channels, said method comprising:

said TDMA communication channels each being assigned to a respective one of said base stations and each being divided into an up-going and a down-going channel each having a plurality of time lots, said base stations each reporting only a radio frequency to one of the said mobile units which has sent a connection request to the base station, awaiting a response from the mobile unit at said radio frequency, and assigning, as a communication channel, a time slot occurring when said response is received, and said mobile unit detecting, when detecting unoccupied time slots after reception of a carrier of said radio frequency, time slots without a signal on both of said up-going and down-going channels, and transmitting said answer to said base station in said time slots.

4. A connection method for use with a radio connection system for a mobile communication system comprising a plurality of base stations and a plurality of mobile units connectable to said base stations over TDMA communication channels, said method comprising:

said TDMA communication channels each being assigned to a respective one of said base stations and being divided into an up-going and a down-going channel each having a plurality of time slots, said base stations each reporting a radio frequency and an unoccupied time slot at said radio frequency to one of the said mobile units which has sent a connection request to the base station, awaiting a response from the mobile unit at said radio frequency, and assigning a time slot occurring when said answer is received as a communication channel, and said mobile unit detecting, when detecting unoccupied time slots after receiving a carrier of said radio frequency, time slots without a signal on both of said up-going and down-going channels, and transmitting said response to said base station in said time slots.

* * * * *